United States Patent [19]

Krutak, Sr.

[11] 3,905,999

[45] Sept. 16, 1975

[54] SYNTHESIS OF 2,3-SUBSTITUTED INDOLES

[75] Inventor: James J. Krutak, Sr., Kingsport, Tenn.

[73] Assignee: Eastman Kodak Company, Rochester, N.Y.

[22] Filed: May 1, 1974

[21] Appl. No.: 465,980

Related U.S. Application Data

[63] Continuation of Ser. No. 264,687, June 20, 1972, abandoned.

[52] U.S. Cl. .............................................. 260/319.1
[51] Int. Cl.$^2$................ C07D 209/04; C07D 209/08
[58] Field of Search .................................. 260/319.1

[56] References Cited
OTHER PUBLICATIONS

Sundberg, "The Chemistry of Indoles," (1970) pp. 168–169.

Elderfield, "Heterocyclic Cmpds.," Vol. 3, pp. 24–25.

*Primary Examiner*—Lewis Gotts
*Assistant Examiner*—S. P. Williams
*Attorney, Agent, or Firm*—Elliott Stern; Daniel B. Reece, III

[57] ABSTRACT

A process for the production of 2,3-substituted indoles from α-haloaldehydes or derivatives thereof and certain primary or secondary aromatic amines is disclosed. These indoles are useful in the production of Fischer type bases which are utilized as intermediates for the synthesis of cyanine dyes and photochromic compositions.

3 Claims, No Drawings

SYNTHESIS OF 2,3-SUBSTITUTED INDOLES

This is a continuation of application Ser. No. 264,687, filed June 20, 1972, now abandoned.

This invention relates to a process for the preparation of 2,3-substituted indoles. More particularly, this invention relates to a novel process for the production of 2,3-substituted indoles from α-haloaldehydes or derivatives thereof and certain primary or secondary aromatic amines. These indoles are useful for many applications such as the production of Fischer type bases which are utilized as intermediates for the synthesis of cyanine dyes and photochromic compositions.

By indole it is meant one of a group of organic heterocyclic compounds in which a benzene ring is fused to a pyrrole ring according to the following formula:

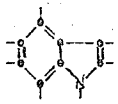

Representative of the known processes for preparing indoles is the Fischer indole synthesis, whereby a phenylhydrazone of an aldehyde or ketone on treatment with an acid is converted to an indole. Specifically, for example, when the starting material is the phenylhydrazone of acetone, the product is 2-methyl indole. Of further interest is U.S. Pat. No. 3,534,059 issued Oct. 13, 1970, and U.S. Pat. No. 2,765,300 issued Oct. 2, 1956. Although these prior known processes can be used to produce indoles, they leave much to be desired from a commercial standpoint.

Therefore, an object of the present invention is to provide a new process which can be practiced on a commercial scale for the production of 2,3-substituted indoles by the reaction of an α-haloaldehyde or derivatives thereof with certain aromatic amines.

Other objects will become apparent from the following description of the invention.

According to this invention it has been found that 2,3-substituted indoles can be prepared by a process which comprises admixing one mole proportion of an α-haloaldehyde or derivatives thereof to at least one-mol proportion of an aromatic, primary or secondary amine at a temperature of from about 100° to about 210°C. for a period of at least about 30 min.; the aromatic amine containing 6 nuclear carbon atoms, from 6 to about 30 carbon atoms in the total molecule, and at least one hydrogen attached to the nitrogen of the amino group and at least one hydrogen on the aromatic nucleus ortho to the amino group.

The term α-haloaldehyde or derivative thereof refers to a group of compounds having the following structure

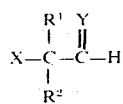

wherein

R¹ and R² are the same or different and each represents alkyl, phenyl, or alkyl substituted with phenyl or alkoxycarbonyl;

R¹ and R² taken together represent $-(CH_2)_m-$ or $-CH-CH-CH-$ where $m$ is a positive integer of 4, 5 or 6 and $n$ is a positive integer of 2, 3 or 4;

X represents chloro, bromo or

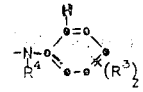

Y represents oxygen or

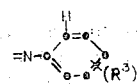

each R³ is the same or different and represents hydrogen, alkyl, halogen, alkoxy, alkanoylamino, alkoxycarbonyl or alkyl substituted with halogen, hydroxy, —SO₂F, cyano or alkanoylamino, $z$ represents a positive integer from 1 to 4; and R⁴ represents hydrogen, alkyl, or alkyl substituted with halogen, hydroxy, alkanoylamino or cyano.

As used herein the term "alkyl" designates a substituent containing from 1 to about 18 carbon atoms.

Examples of the alkyl groups represented by R¹ to R⁴ are methyl, ethyl, propyl, isobutyl, hexyl, decyl, octadecyl, etc.

Examples of R¹ and R² when taken together with the carbon atom to which they are bonded are

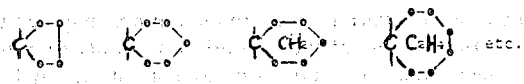

Examples of the groups represented by R³ are chloro, bromo, methoxy, ethoxy, butoxy, propoxy, —NHCOCH₃, —NHCOC₂H₅, COOCH₃, COOC₂H₅, chloroethyl, bromomethyl, bromobutyl, hydroxyethyl, hydroxypropyl, cyanoethyl, cyanobutyl, acetamidoethyl, acetamidopropyl, —SO₂CH₃, etc.

Examples of suitable substituted lower alkyl groups represented by R⁴ are hydroxyethyl, hydroxybutyl, cyanomethyl, cyanoethyl, cyanobutyl, bromomethyl, chloroethyl, acetamidoethyl, acetamidobutyl, ethoxyethyl, methoxyethyl, etc.

In a preferred embodiment of this invention R¹, R², R³ and R⁴ represent the above mentioned radicals except that the groups that contain alkyl moieties from 1 to about 6 carbon atoms.

As used herein to describe a substituent containing an alkyl moiety, the word "lower" designates a carbon content of up to about 6 carbon atoms.

In an especially preferred embodiment of this invention R¹ and R² are lower alkyl;

R³ is hydrogen, lower alkyl or alkoxy;

$z$ is 1 or 2;

R⁴ is hydrogen or lower alkyl;

X is chloro or bromo, and

Y is oxygen.

The aldehydes and the aromatic amines useful in this invention are well-known compounds and are either available commercially or are readily prepared by well-known procedures. The compounds represented by the general formula

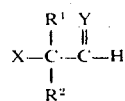

wherein X and Y are represented by

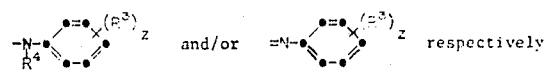

may be prepared according to the following reaction sequence (α-chloroisobutyraldehyde and aniline are used as representative examples for the general reaction):

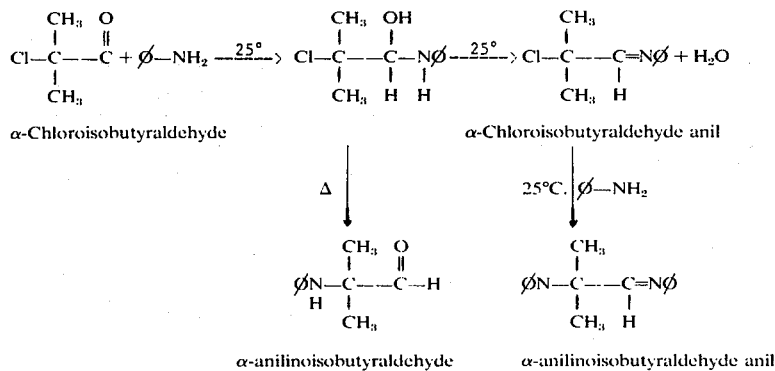

α-Chloroisobutyraldehyde

α-Chloroisobutyraldehyde anil

α-anilinoisobutyraldehyde

α-anilinoisobutyraldehyde anil

Any of a wide variety of aromatic amines may be utilized in the process of this invention, the only requirement being that the amine contain at least one hydrogen substituent on the aromatic nucleus ortho to the amino group and at least one hydrogen atom on the amino group itself. The aromatic amine may contain any of a wide variety of substituents on the nucleus and the nitrogen atom of the amino group. The preferred amine reagent is depicted by the following structural formula:

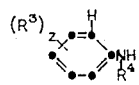

wherein $R^3$, $R^4$ and z are defined as above.

The process is to be conducted at temperatures which are sufficient to produce the desired indole product but insufficient to decompose the product. These results are achieved by conducting the process at a temperature within the range of from about 100° to about 210°C., preferably 130° to about 200°C. Of course, the preferred or optimum temperature varies between these ranges depending upon the specific reagents employed. The time required to complete the reactions will vary with the reactants, however, it has been found that periods of greater than 30 minutes are usually sufficient to complete the reaction, preferably at least about 2 hours.

Generally speaking the process may be conducted under standard atmospheric pressure in an atmosphere of nitrogen. Since the products will autooxidize when dissolved in non-polar solvents containing oxygen, it is desirable to carry out the reaction in the absence of oxygen. Thus, an inert gas blanket is normally used. The reagents may be generally employed in a ratio of 1 mole proportion of α-haloaldehyde or a derivative thereof to at least 3 mole proportions of aromatic amines, preferably at least 5 mole proportions of aromatic amines. An excess of aromatic amine is used in this reaction in order to provide the reaction with a proton acceptor to accept the acid which is produced by the reaction. This reaction proceeds according to the following equation (α-chloroisobutyraldehyde and aniline are used as examples for the general reaction):

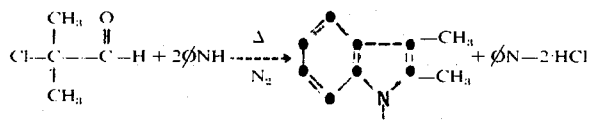

Alternatively 1 mole proportion of α-haloaldehyde and 1 mole proportion of aromatic amine may be used in the presence of a proton accepting reagent such as triethylamine, pyridine, dimethyl pyridine, alkali metal carbonates, bicarbonates or acetates, $Al_2O_3$, BaO, Ca(OH)$_2$, CaO, etc. Generally, this reaction proceeds at temperatures from about 100° to about 150°C. This reaction proceeds according to the following general equation (α-bromoisobutyraldehyde and N-methyl-4-ethylaniline are used as examples for the general reaction):

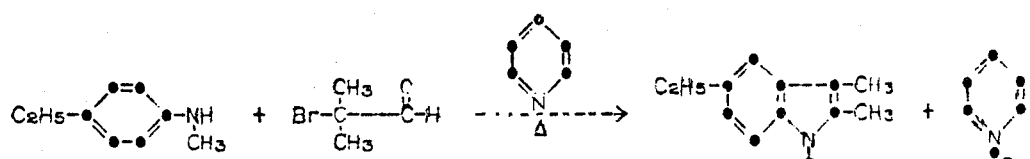

After the reaction has proceeded for at least about 30 minutes, and preferably about 2 hours, the reaction mixture may be cooled and poured onto sufficient hydrogen chloride, ice and water to neutralize an excess aromatic amines or proton accepting reagent such as pyridine. The 2,3-substituted indole products are insoluble and separate as a powder or oil and may be isolated by filtration or extraction with a suitable organic solvent such as methylene chloride, etc. In order to obtain high yields of pure products, care must be exercised in the workout to avoid autooxidation which is well known to occur with 2,3-substituted indoles. The crude products so obtained are sufficiently pure for most purposes. Further purification by standard distillation or recrystallization procedures can be carried out as required. The unused aromatic amines are easily recycled by neutralization of the aqueous phase with sodium hydroxide or any other suitable base, mechanical separation of the amine and distillation.

The indoles generated by the solvent process of this invention using para-substituted primary or secondary amines may be directly converted to Fischer's base compounds substituted in the 5-position by conducting the reaction in the presence of a polyphosphate ester (see application Ser. No. 264,690 filed June 20, 1972, now abandoned). The novel compounds formed thereby can then be directly reacted with any of a large number of compounds which have previously been used to form cyanine dyes or cyanine dye intermediates. The novel process of this invention therefore may be utilized as the first step for an economical one part process for the production of cyanine dye or cyanine dye intermediates.

The following examples are included for a better understanding of this invention.

EXAMPLE 1

N-ethyl aniline (5 moles) is degassed with nitrogen in a 1000 ml. flask, and stirred under an atmosphere of nitrogen. α-Chloroisobutyraldehyde (1 mole) is added at 100°C. and the exothermic reaction is easily controlled or maintained at reflux temperature of about 130° to 140°C. for 15 minutes. The reaction temperature is raised to 180°C. by distilling out water of condensation. After 4 hours at 180°C. the mixture is cooled and poured into sufficient hydrogen chloride and ice and water to neutralize the excess N-ethylaniline. The product formed has the following structural formula and is obtained in a 60% yield.

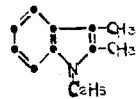

EXAMPLE 2 — Preparation of α-Anilinoisobutyraldehyde.

A solution of 0.50 mole aniline and 0.50 mole triethylamine in 50 g. p-xylene is prepared, stirred vigorously under a nitrogen atmosphere in a 1000 ml. flask, and treated with 0.50 mole α-chloroisobutyraldehyde. The clear solution is heated at the reflux temperature for 3 hr., cooled and stirred 18 hr. at room temperature. Filtration gives 0.50 moles triethylamine hydrochloride. Petroleum ether (200 ml.) is added to the filtrate which is chilled and induced to crystallize. Filtration gives 15 g. of α-anilinoisobutyraldehyde, m.p. 87°–91°C. (recrystallized from chloroform: petroleum ether).

EXAMPLE 3 — Preparation of α-Chloroisobutyraldehyde Anil.

Aniline (0.25 mole) is cooled to 0°C. in a 1000 ml. flask and treated with 0.25 mole α-chloroisobutyraldehyde; water rapidly separates and the equilibrium mixture is found to contain 60 mole % of the α-chlorobutyraldehyde anil, water, and reactants.

The product is isolated in pure form by repeating the above reaction using, however, a $CCl_4$ solvent and adding anhydrous $MgSO_4$ to shift the equilibrium to completion. Filtration gives a carbon tetrachloride solution of the pure anil.

EXAMPLE 4 — Preparation of α-Anilinoisobutyraldehyde Anil.

A solution of 1 mole α-anilinoisobutyraldehyde and 1 mole aniline in 200 g. benzene is refluxed in a 1000 ml. flask under a Dean-Stark trap until 1 mole of water is collected. Evaporation of the benzene gives an oil which is shown to be α-anilinoisobutyraldehyde anil.

EXAMPLES 5–7

The products of Examples 2, 3 and 4 are reacted with aniline under the conditions described in Example 1. In each case the product is high assay 2,3-dimethylindole.

EXAMPLE 8

A solution of 1 mole of p-toluidine in pyridine (5 moles) is degassed with nitrogen in a 1000 ml. flask and treated with 1 mole of α-chloroisobutyraldehyde. After the exothermic reaction subsides, the solution is heated at reflux temperatures (115°C.) under an atmosphere of nitrogen for 1 to 3 hours, cooled, and poured on ice and water containing sufficient hydrogen chloride to neutralize the excess pyridine. The product separates as a fine powder which is filtered, dried, and further purified by recrystallization. The product is obtained in 65% yield and has the following structural formula:

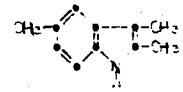

Similar results are obtained when 2,6-dimethylpyridine is used as a solvent.

EXAMPLES 9–15

The following indoles are prepared in accordance with the procedure described in Example 1 except that the reactants are varied as indicated.

| Example | Amine | Aldehyde | Indole Product | Isolated Yield (%) | Estimated Actual Yield (%) |
|---|---|---|---|---|---|
| 9 | aniline | α-chloroisobutyraldehyde | 2,3-dimethylindole | 60 | 90 |
| 10 | o-anisidine | do. | 2,3-dimethyl-7-methoxyindole | 57 | 90 |
| 11 | o-toluidine | do. | 2,3-dimethyl-7-methylindole | 73 | 90 |
| 12 | aniline | α-chlorodiphenylacetaldehyde | 2,3-diphenylindole | 76 | 90 |
| 13 | N-methylaniline | α-chloroisobutyraldehyde | 1-methyl-2,3-dimethylindole | 33 | 40 |
| 14 | aniline | α-chlorocyclohexanecarboxaldehyde | 2,3-pentamethyleneindole | 51 | 80 |
| 15 | aniline | 2-chloro-2-ethylbutyraldehyde | 2,3-diethylindole | 65 | 90 |

EXAMPLES 16–21

The following indoles are prepared in accordance with the procedure described in Example 8, except that the reactants are varied as indicated.

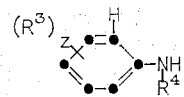

| Ex. | Amine | Aldehyde | Indole Product | Isolated Yield (%) | Estimated Actual Yield (%) |
|---|---|---|---|---|---|
| 16 | p-anisidine | α-bromoisobutyraldehyde | 2,3-dimethyl-5-methoxyindole | 90 | >90 |
| 17 | p-acetamidoaniline | do. | 2,3-dimethyl-5-acetamidoindole | 50 | >90 |
| 18 | p-chloroaniline | do. | 2,3-dimethyl-5-chloroindole | 40 | >90 |
| 19 | 2,4-dimethoxyaniline | α-chloroisobutyraldehyde | 2,3-dimethyl-5,7-dimethoxyindole | 25 | >90 |
| 20 | p-toluidine | α-chlorodiphenylacetaldehyde | 2,3-diphenyl-5-methylindole | 90 | >90 |
| 21 | p-toluidine | α-chlorocyclohexanecarboxaldehyde | 2,3-pentamethylene-5-methylindole | 80 | >90 |

Although the invention has been described in considerable detail with particular reference to certain preferred embodiments thereof, variations and modifications can be effected within the spirit and scope of the invention.

I claim:

1. A method of preparing 2,3-substituted indoles which comprises the steps of:

admixing 1 mole proportion of a compound having the formula

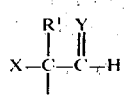

to at least 1 mole proportion of an amine having the formula and heating the admixture for at least about 30 minutes at a temperature between 100° and about 210°C.;

wherein $R^1$ and $R^2$ are lower alkyl;

$R^3$ is hydrogen, lower alkyl or lower alkoxy;

$z$ is 1 or 2;

$R^4$ is hydrogen or lower alkyl;

X is chloro or bromo; and

Y represents oxygen.

2. Method of claim 1 conducted in the presence of at least 3 mole proportions of amine.

3. Method of claim 1 conducted in at least 1 mole proportion of a proton accepting reagent.

* * * * *